(12) United States Patent
Ogura (10) Patent No.: US 10,615,017 B2
(45) Date of Patent: Apr. 7, 2020

(54) MASS SPECTROMETER (71) Applicant: SHIMADZU CORPORATION, Kyoto-shi, Kyoto (JP)

(72) Inventor: Tairo Ogura, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 345 days.

(21) Appl. No.: 14/780,077

(22) PCT Filed: Mar. 26, 2013

(86) PCT No.: PCT/JP2013/058807
§ 371 (c)(1),
(2) Date: Sep. 25, 2015

(87) PCT Pub. No.: WO2014/155530
PCT Pub. Date: Oct. 2, 2014

(65) Prior Publication Data
US 2016/0042929 A1 Feb. 11, 2016

(51) Int. Cl.
H01J 49/00 (2006.01)
G01N 30/72 (2006.01)

(52) U.S. Cl.
CPC ........ *H01J 49/005* (2013.01); *H01J 49/0031* (2013.01); *H01J 49/0045* (2013.01); *G01N 30/7206* (2013.01); *G01N 30/7233* (2013.01)

(58) Field of Classification Search
CPC .. H01J 49/005; H01J 49/0031; H01J 49/0045; G01N 33/6848; G01N 30/7206; G01N 30/7233

(Continued)

(56) References Cited

U.S. PATENT DOCUMENTS

2005/0063864 A1* 3/2005 Sano ............... G01N 33/6848
422/68.1
2006/0255263 A1* 11/2006 Ishimaru .......... G01N 30/8675
250/288

FOREIGN PATENT DOCUMENTS

| JP | 2006-317326 A | 11/2006 |
| JP | 2010-117377 A | 5/2010 |
| JP | 2012-225862 A | 11/2012 |

OTHER PUBLICATIONS

International Search Report for PCT/JP2013/058807 dated Apr. 23, 2013.

(Continued)

*Primary Examiner* — Michael Maskell
(74) *Attorney, Agent, or Firm* — Sughrue Mion, PLLC (57) ABSTRACT

A mass spectrometer including a memory unit storing information indicating combinations of precursor ions for CIDs in respective stages. If an $MS^1$ spectrum on which CID is not performed is obtained during execution of an analysis, a precursor ion selector determines whether an ion registered as a precursor ion for the first-stage CID exists on the $MS^1$ spectrum, based on the list held in the memory unit. If the ion exists, an $MS^2$ analysis in which the ion is set as a precursor ion is immediately executed. Subsequently, the precursor ion selector determines whether or not an ion registered as a precursor ion for the second-stage CID in association with the precursor ion for the first-stage CID exists on an $MS^2$ spectrum. If the ion exists, an $MS^3$ analysis in which the ion is set as a precursor ion is immediately executed, so that an $MS^3$ spectrum is acquired.

13 Claims, 4 Drawing Sheets (58) Field of Classification Search
USPC .................................................. 250/281, 282
See application file for complete search history.

(56) References Cited

OTHER PUBLICATIONS

International Written Opinion for PCT/JP2013/058807 dated Apr. 23, 2013 [PCT/ISA/237].

* cited by examiner

| | MS² MS³ | START TIME | END TIME |
|---|---|---|---|
| 331 | A1 → A2 | t1 | t2 |
| | B1 → B2 | t3 | t4 |
| | C1 → C2 | t4 | t5 |

MASS SPECTROMETER

CROSS REFERENCE TO RELATED APPLICATIONS

This application is a National Stage of International Application No. PCT/JP2013/058807 filed Mar. 26, 2013, the contents of which are incorporated herein by reference in their entirety.

TECHNICAL FIELD

The present invention relates to a mass spectrometer capable of an $MS^n$ (n is an integer equal to or more than 3) analysis with a multi-stage ion dissociation operation, such as an ion trap mass spectrometer, and more specifically, to an $MS^n$ mass spectrometer suitably combined with a gas chromatograph or a liquid chromatograph.

BACKGROUND ART

An MS/MS analysis (tandem analysis) has been known as one of mass analyses using an ion trap mass spectrometer or similar mass analyzer. In a typical MS/MS (=$MS^2$) analysis, ions having a specific mass-to-charge ratio m/z are first selected as precursor ions from various ions originating from a compound to be analyzed, the selected ions are dissociated through collision induced dissociation (CID) or the like, and product ions having low mass-to-charge ratios are generated. The specific form of the dissociation at this time depends on the structure of the original compound. Then, the product ions generated through the dissociation are subjected to a mass analysis, so that an $MS^2$ spectrum is acquired. Through an analysis on the $MS^2$ spectrum, the target compound is identified, and the chemical structure of the target compound is obtained.

However, compounds having a large molecular weight, such as peptide, and compounds difficult to dissociate cannot be dissociated into ions having an adequately low mass-to-charge ratio, through a one-stage CID operation. In such a case, selection of a precursor ion and its CID operation are repeated several times, and finally produced product ions are subjected to a mass analysis. Such a process is called the $MS^n$ analysis. Herein, mass spectrometer that performs the $MS^n$ analysis is called the $MS^n$ mass spectrometer.

In a chromatograph mass spectrometer including a liquid chromatograph (LC) or a gas chromatograph (GC) and an $MS^n$ mass spectrometer in combination, if components contained in a sample are known, the mass-to-charge ratio of precursor ions to be subjected to an $MS^n$ analysis can be set in advance for the retention time of each component in order to acquire an $MS^n$ spectrum of a target component. However, if components contained in a sample are unknown, precursor ions to be subjected to an $MS^n$ analysis cannot be set in advance, and an $MS^n$ analysis result of an unknown component that is contained in the sample in addition to a target component cannot be obtained. To deal with this, a mass spectrometer has been known up to now, the mass spectrometer having a function of: automatically selecting appropriate precursor ions from a result obtained through an $MS^1$ analysis without a CID operation; and executing an $MS^n$ analysis in substantially real time (which is hereinafter called the automatic $MS^n$ function).

For example, as disclosed in Patent Literature 1, in a conventional $MS^n$ mass spectrometer having the automatic $MS^n$ function, examples of the conditions for automatically selecting precursor ions from among a plurality of peaks appearing on an $MS^1$ spectrum obtained through an $MS^1$ analysis include: selecting peaks in decreasing order of signal intensity; and selecting peaks whose signal intensity is in a predetermined intensity range. Moreover, an ion exclusion list or an ion priority list may be set in advance to prevent ions having a mass-to-charge ratio registered in the ion exclusion list from being selected as precursor ions, even if the ions satisfy the aforementioned criterion. Conversely, ions having a mass-to-charge ratio registered in the ion priority list are selected as precursor ions when peak of the ions appears, even if the ions do not satisfy the aforementioned criterion.

Particularly when protein, lipid, and the like are identified from a biological sample, it is necessary to efficiently select ions originating from a target component from among an enormous number of components including impurities to perform an $MS^n$ analysis. Accordingly, the following measurement technique has been adopted up to now. That is, precursor ions to be desired to be dissociated through CID are registered in advance in the ion priority list, and, when an ion registered in the list (which is hereinafter called the "precursor ion list") is observed, a CID operation is executed in which the ion is set as a precursor ion.

Figure 7:
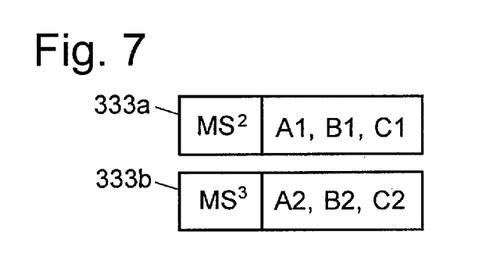
FIG. 7 is a diagram illustrating an example of a precursor ion list used in a conventional mass spectrometer.

Moreover, in the case where a multi-stage CID operation is desired to be performed to fragment ions originating from a sample component into smaller parts, a list of precursor ions to be dissociated is created for each stage of the CID operation. Specifically, for example, in the case of executing an $MS^3$ analysis, as shown in FIG. 7, a list 333a of precursor ions to be dissociated in the first-stage CID operation and a list 333b of precursor ions to be dissociated in the second-stage CID operation are created in advance. In FIG. 7, A1, B1, etc. represent the values of mass-to-charge ratios. For example, if an ion registered in the precursor ion list 333a is detected on an $MS^1$ spectrum during execution of an analysis, an $MS^2$ analysis in which the detected ion is set as a precursor ion is immediately executed. If an ion registered in the precursor ion list 333b is then detected on an $MS^2$ spectrum obtained through the $MS^2$ analysis, an $MS^3$ analysis in which the detected ion is set as a precursor ion for the second-stage CID operation is immediately executed, so that an $MS^3$ spectrum is acquired.

In the example shown in FIG. 7, for example, if a peak having the mass-to-charge ratio specified by A1 is detected on the $MS^1$ spectrum during execution of the analysis, the $MS^2$ analysis in which the ion having the mass-to-charge ratio specified by A1 is set as the precursor ion is executed, so that an $MS^2$ spectrum is obtained. Then, if the mass-to-charge ratio specified by any of A2, B2, and C2 is detected on the $MS^2$ spectrum, the first-stage CID operation in which the ion having the mass-to-charge ratio specified by A1 is set as the precursor ion is performed. Subsequently, the second-stage CID operation in which the ion having the mass-to-charge ratio specified by A2, B2, or C2 is set as the precursor ion is performed. Resultant product ions are subjected to a mass analysis. As a result, the $MS^3$ spectrum is obtained.

However, according to such a conventional automatic $MS^n$ function, actually meaningless unnecessary analyses are executed in many cases, and there is a problem of low $MS^n$ analysis efficiency. The reason for this is as follows: for example, execution of the second-stage CID operation in which an ion having the mass-to-charge ratio specified by C2 is set as the precursor ion can only be meaningful after the first-stage CID operation in which an ion having the mass-to-charge ratio specified by C1 is set as the precursor ion is executed; and, even in such a case, if an ion having a mass-to-charge ratio equal to or very close to the mass-tocharge ratio specified by C2 happen to be observed on the $MS^2$ spectrum obtained by setting an ion having the mass-to-charge ratio specified by A1 as the precursor ion, the second-stage CID operation in which the observed ion is set as the precursor ion may be unnecessarily executed. In a chromatograph mass analysis, the sample component introduced into the mass spectrometer changes with the passage of time, and hence the time for which one sample component is introduced into the mass spectrometer is limited. Accordingly, if a substantially meaningless $MS^3$ analysis (or an $MS^n$ analysis whose n is equal to or more than 4) is executed as described above, the time for executing an essentially necessary $MS^3$ analysis runs short. As a result, information for identifying a component desired to be identified may be lacking, and omission of a component detection may occur in some cases.

CITATION LIST

Patent Literature

[Patent Literature 1] JP 2012-225862 A

SUMMARY OF INVENTION

Technical Problem

Under the circumstances, particularly when an $MS^n$ analysis is automatically executed using the automatic $MS^n$ function, it is necessary to reduce execution of meaningless $MS^n$ analyses as much as possible. The present invention, which has been made in view of such a problem, has an object to provide a mass spectrometer capable of: preventing execution of an unnecessary $MS^n$ analysis through which useful spectrum information cannot be obtained; and efficiently collecting information meaningful for component identification, when the automatic $MS^n$ function of automatically selecting precursor ions and dissociating the precursor ions is implemented.

Solution to Problem

The present invention aimed at solving the aforementioned problem provides a mass spectrometer capable of an $MS^n$ analysis (whose n is an integer equal to or more than 3) involving a dissociation operation conducted in at least n−1 stages, the mass spectrometer having an automatic $MS^n$ analysis function of executing, given an $MS^m$ (whose m is an integer) spectrum obtained through an $MS^m$ analysis, an operation of: selecting an ion that satisfy a predetermined condition as a precursor ion for an $MS^{m+1}$ analysis from the $MS^m$ spectrum; and dissociating the precursor ion and performing a mass analysis, until the value of m becomes n−1 in order from 1, the mass spectrometer comprising:

a) a precursor ion information memory unit for holding information on mass-to-charge ratios of precursor ions to be dissociated in first to $m^{th}$ stages for the $MS^{m+1}$ analysis in association with one another; and b) an analysis controller configured to acquire an $MS^n$ spectrum by executing, up to the $MS^n$ analysis, an operation of: determining whether or not an ion that is held as a precursor ion to be dissociated in the first stage in the precursor ion information memory unit exists on an $MS^1$ spectrum obtained at a time of executing an analysis; performing an $MS^2$ analysis in which the ion is set as a precursor ion, if the ion exists; determining whether or not an ion that is held as a precursor ion to be dissociated in the second stage in association with the precursor ion to be dissociated in the first stage in the precursor ion information memory unit exists on an $MS^2$ spectrum obtained through the $MS^2$ analysis; and performing an $MS^3$ analysis in which the ion is set as a precursor ion, if the ion exists.

The mass spectrometer according to the present invention is, typically, a mass spectrometer including a three-dimensional quadrupole or linear ion trap and being capable of: temporarily capturing ions by means of the ion trap; selecting ions having a specific mass-to-charge ratio; and performing an ion dissociation operation using CID or other techniques.

As a first specific form of the mass spectrometer according to the present invention, the precursor ion information memory unit may hold a list of a collection of information on the mass-to-charge ratios of the precursor ions to be dissociated in the first to $m^{th}$ stages for one $MS^{m+1}$ analysis.

Moreover, as a second specific form of the mass spectrometer according to the present invention, the precursor ion information memory unit may hold: m lists of a collection of information on the mass-to-charge ratios of the precursor ions to be dissociated for each of the first to $m^{th}$ stages; and information specifying a combination of the mass-to-charge ratios of the precursor ions respectively selected from the m lists, for one $MS^{m+1}$ analysis.

That is, in the mass spectrometer according to the first specific form, the mass-to-charge ratios of the precursor ions to be dissociated in the first to $m^{th}$ stages, which are necessary to execute one $MS^{m+1}$ analysis, can be directly extracted from the list itself held in the precursor ion information memory unit. Meanwhile, in the mass spectrometer according to the second specific form, the mass-to-charge ratios of the precursor ions are registered in each of the m lists held in the precursor ion information memory unit, and, by using the information held in the same memory unit, the mass-to-charge ratios of the precursor ions to be dissociated in the first to $m^{th}$ stages, which are necessary to execute one $MS^{m+1}$ analysis, can be extracted.

In any case, in the mass spectrometer according to the present invention, for example, combination of m precursor ions for obtaining an $MS^{m+1}$ spectrum meaningful for sample component identification can be obtained by using the information held in the precursor ion information memory unit.

As soon as an $MS^1$ spectrum is obtained by executing a normal mass analysis without a dissociation operation on a sample under the control of the analysis controller, it is immediately determined whether or not an ion that is held as a precursor ion to be dissociated in the first stage in the precursor ion information memory unit is observed on the $MS^1$ spectrum. If the ion is observed, an $MS^2$ analysis in which the ion is set as the precursor ion is executed, so that an $MS^2$ spectrum is obtained. Subsequently, it is immediately determined whether or not an ion that is held as a precursor ion to be dissociated in the second stage in association with the precursor ion to be dissociated in the first stage in the precursor ion information memory unit is observed on the $MS^2$ spectrum. If the ion is observed, an $MS^3$ analysis in which the ion is set as the precursor ion is executed, so that an $MS^3$ spectrum is obtained. Such an operation is executed up to $MS^n$ analysis as long as target precursor ions are observed, whereby an $MS^n$ spectrum is finally obtained. The $MS^1$ spectrum, the $MS^2$ spectrum, . . . , the $MS^n$ spectrum thus obtained can be used for sample component identification through, for example, database retrieval.

In this way, the mass spectrometer according to the present invention can prevent unfavorable execution of an $MS^n$ analysis based on a combination other than the aforementioned combination of m precursor ions for obtaining the $MS^{m+1}$ spectrum meaningful for sample component identification. As a result, because execution of meaningless $MS^n$ analyses are prevented, enough time can be allotted to execute a meaningful $MS^n$ analysis.

In the mass spectrometer according to the present invention, preferably, a chromatograph for separating components in a sample in a temporal direction may be connected upstream of the mass spectrometer, and the precursor ion information memory unit may hold information indicating a time range in which the $MS^{m+1}$ analysis is performed, in addition to the information on the mass-to-charge ratios of the precursor ions to be dissociated in the first to $m^{th}$ stages for the $MS^{m+1}$ analysis.

The chromatograph here is, typically, a gas chromatograph or a liquid chromatograph. The time range in which the $MS^{m+1}$ analysis is performed is determined based on the retention time of a target component in the chromatograph.

According to this configuration, after the various components contained in the sample are separated in the temporal direction by the chromatograph, an $MS^n$ analysis targeting at precursor ions corresponding to a given component is executed around only the time at which the given component is estimated to appear. Accordingly, the time range in which an $MS^n$ analysis based on a specific combination of precursor ions is executed is limited, so that execution of not only an unnecessary $MS^n$ analysis but also unnecessary $MS^2$ and subsequent analyses performed prior to the $MS^n$ analysis can also be reduced.

Moreover, the mass spectrometer according to the present invention may further comprise:

c) a compound database for holding the $MS^1$ spectrum, the $MS^2$ spectrum, . . . , the $MS^{m+1}$ spectrum for a known compound; and d) a precursor ion information creator for: creating information in which the mass-to-charge ratios of the precursor ions to be dissociated in the first to $m^{th}$ stages for the $MS^{m+1}$ analysis are associated with one another, using the compound database; and storing the information into the precursor ion information memory unit.

Here, the compound database may be any of a database provided by a manufacturer of the present apparatus, a database created by various research institutes such as a university and is generally available via the Internet or the like, and a private database created by a user based on results of actually performed analyses and the like.

According to this configuration, information to be stored into the precursor ion information memory unit can be automatically created using an existing database, and hence the user can save the trouble of manually inputting such information through a keyboard or the like.

Advantageous Effects of Invention

With the mass spectrometer according to the present invention, when an $MS^n$ analysis is executed using an automatic $MS^n$ function, for example, execution of an unnecessary $MS^n$ analysis irrelevant to component identification can be avoided, and information meaningful for the component identification can be efficiently collected. In particular, in a chromatograph mass spectrometer, although the time for which one sample component is introduced into the mass spectrometer is significantly limited as described above, execution of an unnecessary $MS^n$ analysis can be eliminated, and a meaningful $MS^n$ analysis can be reliably executed. Accordingly, the accuracy of the component identification can be enhanced, and an omission of component detection can be prevented.

DESCRIPTION OF EMBODIMENTS

Figure 1:
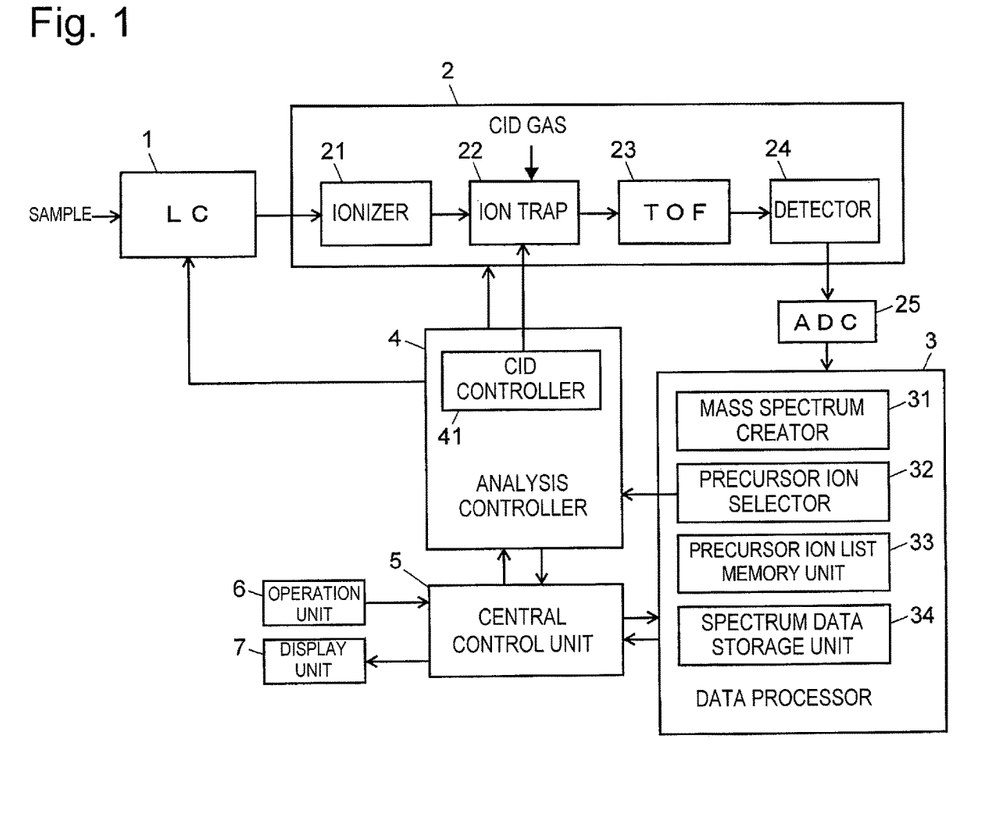
FIG. 1 is a schematic configuration diagram of an embodiment of an LC-MS system including a mass spectrometer according to the present invention.

Hereinafter, an embodiment of an LC-MS system including a mass spectrometer according to the present invention is described with reference to the attached drawings. FIG. 1 is a schematic configuration diagram of an LC-MS system according to the present embodiment.

This system includes: a liquid chromatograph (LC) 1 for temporally separating components contained in a liquid sample; a mass analyzer (MS) 2 for separately detecting the separated components in accordance with their mass-to-charge ratios m/z and capable of an $MS^n$ analysis; a data processor 3 for processing data acquired by the mass analyzer 2; an analysis controller 4 for controlling the operation of each unit; a central control unit 5 for comprehensively controlling the entire system; and an operation unit 6 and a display unit 7 as user interfaces. At least part of the data processor 3, the analysis controller 4, and the central control unit 5 uses a personal computer as hardware resources, and their functions are implemented by executing dedicated software for data processing/control installed on the computer.

Although not shown, the liquid chromatograph 1 includes a liquid sending pump, an injector, and a column, and separates various components contained in the sample in the temporal direction. The mass analyzer 2 includes: an ionizer 21 for ionizing the sample components using an atmospheric pressure ionization method such as an electrospray ionization method; an ion trap 22 for temporarily capturing the generated ions, sort ions having a specific mass-to-charge ratio as precursor ions, and then dissociate the precursor ions through a CID operation; a time-of-flight mass spectrograph (TOF) 23 for separating the ions emitted from the ion trap 22 in accordance with their mass-to-charge ratios; a detector 24 for detecting the ions separated by the time-of-flight mass spectrograph 23; and an analog-digital converter (ADC) 25 for converting the signal detected by the detector 24 into digital data. The ion trap 22 is, for example, a three-dimensional quadrupole or linear ion trap, and can repeat the precursor ion sorting and the CID operation several times. The configuration of the mass spectrometer 2 is not limited as long as the mass analyzer 2 is capable of an $MS^n$ analysis whose n is equal to or more than 3.

In the mass analyzer 2, various ions that are emitted almost all together from the ion trap 22 are provided with a time difference according to their mass-to-charge ratios while flying in the flight space of the time-of-flight mass spectrograph 23, and then reach the detector 24. Based on the time point at which the ions are emitted from the ion trap 22 as a criterion, the detector 24 outputs an intensity signal according to the amount of ions that sequentially reach with the passage of time. Data obtained by digitizing this signal is time-of-flight spectrum data on which the intensity changes with the passage of time in accordance with the time of flight of each ion.

In the data processor 3, a mass spectrum creator 31 converts the times of flight of the time-of-flight spectrum data thus obtained into mass-to-charge ratios, and creates a mass spectrum over a predetermined mass-to-charge ratio range. The mass spectrum here includes an $MS^2$ spectrum and an $MS^3$ spectrum. A precursor ion selector 32 performs peak detection on the mass spectrum to collect peak information, and retrieves whether or not ions to be dissociated in an $MS^2$ analysis and an $MS^3$ analysis exist in the collected peak information, based on information stored in a precursor ion list memory unit 33. Then, if ions to be dissociated exist, the precursor ion selector 32 selects the ion as precursor ions. That is, the precursor ion selector 32 is a functional block that executes main data processing at the time of implementing an automatic $MS^n$ function in this LC-MS system.

The analysis controller 4 includes a CID controller 41 for controlling the operation of the ion trap 22 in order to execute, particularly, the $MS^2$ analysis and the $MS^3$ analysis. The information (specifically, the mass-to-charge ratios) on the precursor ions selected by the precursor ion selector 32 is sent to the analysis controller 4, and the CID controller 41 drives the ion trap 22 to sort and dissociate the selected precursor ions through CID.

The precursor ion list memory unit 33 holds a precursor ion list in which a precursor ion to be subjected to the first-stage CID operation and a precursor ion to be subjected to the second-stage CID operation at the time of executing the $MS^3$ analysis are registered. What is characteristic here is that this precursor ion list is not independent precursor ion lists for the first-stage CID operation and the second-stage CID operation as shown in FIG. 7 but a list in which a precursor ion for the first-stage CID operation and a precursor ion for the second-stage CID operation are combined in advance. An example of this precursor ion list 331 is shown in FIG. 2.

In this example, the combination of: the mass-to-charge ratio of the precursor ion for the first-stage CID operation (namely, the precursor ion for the $MS^2$ analysis); and the mass-to-charge ratio of the precursor ion for the second-stage CID operation (namely, the precursor ion for the $MS^3$ analysis) is defined, and the time range in which the $MS^3$ analysis is possible is further defined for each combination by means of the start time and the end time. For example, according to this precursor ion list 331, the $MS^3$ analysis in which the mass-to-charge ratio of the precursor ion for the first-stage CID operation is A1 while the mass-to-charge ratio of the precursor ion for the second-stage CID operation is A2 can be executed in the time range of t1 to t2.

Figure 2:
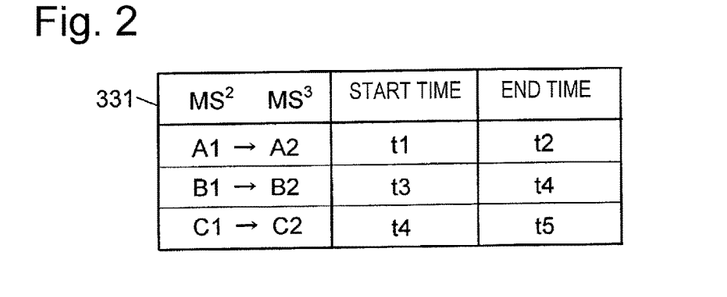
FIG. 2 is a diagram illustrating an example of a precursor ion list used in the LC-MS system of the present embodiment.

Next, a characteristic $MS^n$ analysis operation executed in the LC-MS system of the present embodiment when the precursor ion list 331 shown in FIG. 2 is held in the precursor ion list memory unit 33 is described with reference to FIG. 3A and FIG. 3B.

In response to an instruction to start an analysis, the analysis is started, and a liquid sample is introduced into the liquid chromatograph 1. Consequently, components contained in the sample are temporally separated and eluted while passing through the column (not shown). In the mass analyzer 2, a mass analysis without a CID operation is repetitively executed on the sample components in the eluate at a given time interval. In the mass spectrum creator 31, one mass ($MS^1$) spectrum is created correspondingly to one mass analysis. If all ion intensities included in the one $MS^1$ spectrum are aggregated and arranged in the temporal direction, a total ion chromatogram (TIC) shown in FIG. 3A is obtained. FIG. 3B shows only $MS^1$ spectra 31a and 31b at times tx and ty shown in FIG. 3A, but an $MS^1$ spectrum is obtained at a given time interval also between tx to ty, in reality.

If one mass analysis is executed and one $MS^1$ spectrum is correspondingly created, the precursor ion selector 32 automatically selects a precursor ion for the $MS^2$ analysis according to the aforementioned precursor ion list 331 held in the precursor ion list memory unit 33. Then, in the case where a precursor ion that satisfies a condition is observed, the precursor ion selector 32 sends information on the precursor ion to the analysis controller 4.

Figure 3A:
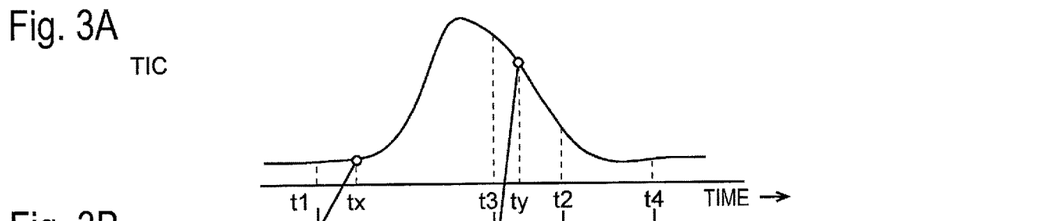
FIG. 3A and FIG. 3B are operation explanatory diagrams when an automatic $MS^n$ function in the LC-MS system of the present embodiment is implemented.
Figure 3B:
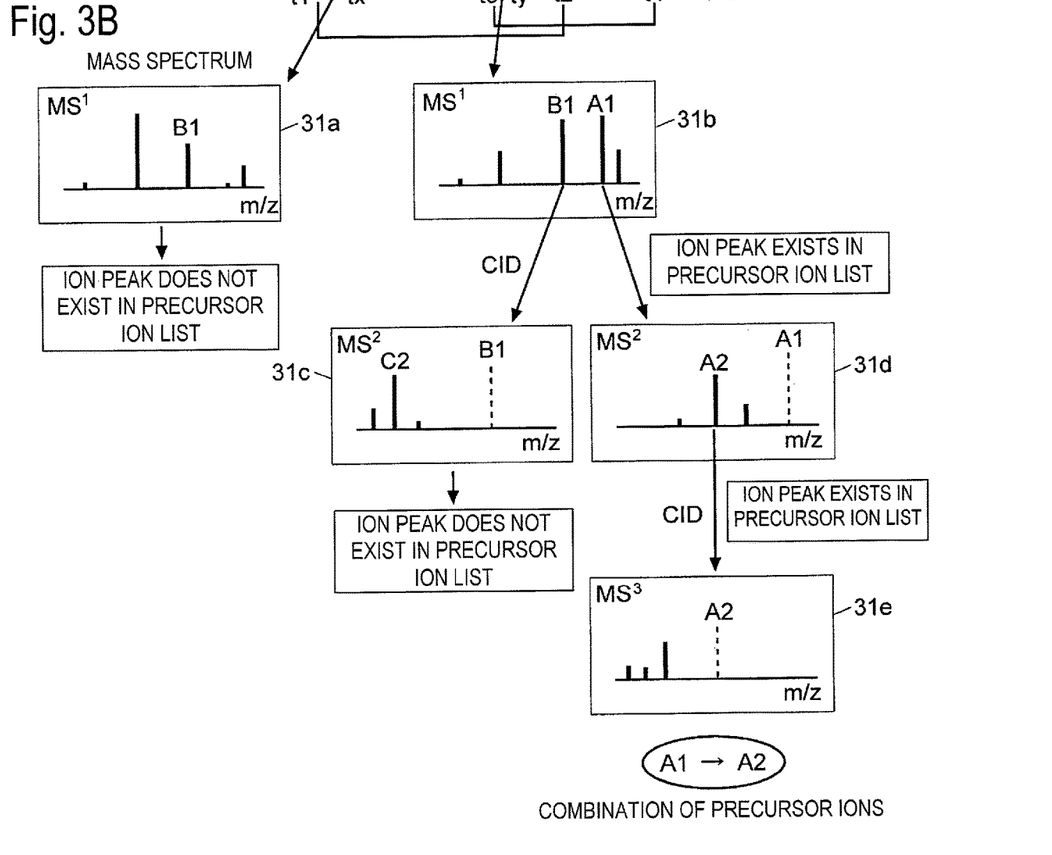

Description is given by way of the example shown in FIG. 3A and FIG. 3B. If one $MS^1$ spectrum 31a is created at the time tx, the precursor ion selector 32 automatically selects a precursor ion for the $MS^2$ analysis according to the precursor ion list 331. That is, the time tx is t1≤tx≤t2, and, according to the precursor ion list 331 shown in FIG. 2, only the $MS^3$ analysis in which the mass-to-charge ratio of the precursor ion for the first-stage CID operation is A1 while the mass-to-charge ratio of the precursor ion for the second-stage CID operation is A2 can be executed in the time range of t1 to t2. Accordingly, the precursor ion selector 32 determines whether or not an ion peak having the mass-to-charge ratio specified by A1 as the precursor ion for the first-stage CID operation exists on the $MS^1$ spectrum 31a obtained at the time tx.

Here, any ion peak having the mass-to-charge ratio specified by A1 is not observed on the $MS^1$ spectrum 31a. Hence a precursor ion is not selected, and the $MS^2$ analysis is not executed. Although an ion peak having the mass-to-charge ratio specified by B1 in the precursor ion list 331 exists on the $MS^1$ spectrum 31a, a precursor ion having the mass-to-charge ratio specified by B1 is effective in only the time range of t3 to t4, and the time tx is not in this time range. Hence, the ion peak having the mass-to-charge ratio specified by B1 is ignored.

If one $MS^1$ spectrum 31b is created at the time ty, the precursor ion selector 32 automatically selects a precursor ion for the $MS^2$ analysis according to the precursor ion list 331, similarly to the operation at the time tx. The time ty is t1≤ty≤t2 and t3≤ty≤t4, and, according to the precursor ion list 331 shown in FIG. 2, two $MS^3$ analyses can be executed in these time ranges: the $MS^3$ analysis in which the mass-to-charge ratio of the precursor ion for the first-stage CID operation is A1 while the mass-to-charge ratio of the precursor ion for the second-stage CID operation is A2; and the $MS^3$ analysis in which the mass-to-charge ratio of the precursor ion for the first-stage CID operation is B1 while the mass-to-charge ratio of the precursor ion for the second-stage CID operation is B2. Accordingly, the precursor ion selector 32 first determines whether or not an ion peak having the mass-to-charge ratio specified by A1 as the precursor ion for the first-stage CID operation exists on the $MS^1$ spectrum 31*b* obtained at the time t*y*.

Here, an ion peak having the mass-to-charge ratio specified by A1 is observed on the $MS^1$ spectrum 31*b*. Consequently, the precursor ion selector 32 reports the mass-to-charge ratio of the precursor ion concerning the observed ion peak, to the analysis controller 4. Under the control of the analysis controller 4 including the CID controller 41, the $MS^2$ analysis in which the ion having the mass-to-charge ratio specified by A1 is set as the precursor ion is immediately executed.

That is, the sample components in the eluate from the liquid chromatograph 1 are ionized by the ionizer 21, and the generated ions are temporarily captured by the ion trap 22. Then, under the control of the CID controller 41, the ion trap 22 is driven such that only ion having the mass-to-charge ratio specified by A1 remains in the ion trap 22, and the remaining ion is dissociated through contact with a CID gas introduced from the outside. Various product ions generated through the dissociation are emitted almost at the same time from the ion trap 22, are separated in accordance with their mass-to-charge ratios while passing through the time-of-flight mass spectrograph 23, and reach the detector 24. As a result, in the mass spectrum creator 31, an $MS^2$ spectrum 31*d* is created.

As soon as the $MS^2$ spectrum 31*d* is obtained, the precursor ion selector 32 determines whether or not a precursor ion for the second-stage CID operation having the mass-to-charge ratio of A2 that are associated with the precursor ion for the first-stage CID operation having the mass-to-charge ratio of A1 in the precursor ion list 331 exists on the $MS^2$ spectrum 31*d*. Here, an ion peak having the mass-to-charge ratio specified by A2 is observed on the $MS^2$ spectrum 31*d*. Consequently, the precursor ion selector 32 reports the mass-to-charge ratio of the precursor ion concerning the observed ion peak, to the analysis controller 4. Under the control of the analysis controller 4 including the CID controller 41, the CID operation in which the ion having the mass-to-charge ratio specified by A1 is set as the precursor ion is first executed. Subsequently, the product ions thus generated are subjected to the second-stage CID operation in which the ion having the mass-to-charge ratio specified by A2 is set as the precursor ion. The product ions generated through such two-stage CID are introduced into the time-of-flight mass spectrograph 23 to be mass-separated by the time-of-flight mass spectrograph 23, and are detected by the detector 24. As a result, in the mass spectrum creator 31, an $MS^3$ spectrum 31*e* is created. Entire data constituting the $MS^1$ spectrum, the $MS^2$ spectrum, and the $MS^3$ spectrum thus obtained is stored in a spectrum data storage unit 34.

Further, the precursor ion selector 32 determines whether or not an ion peak having the mass-to-charge ratio specified by B1 as the precursor ion for the first-stage CID operation exists on the $MS^1$ spectrum 31*b* obtained at the time t*y*. Here, an ion peak having the mass-to-charge ratio specified by B1 is observed on the $MS^1$ spectrum 31*b*. Consequently, the precursor ion selector 32 reports the mass-to-charge ratio of the precursor ion concerning the observed ion peak, to the analysis controller 4, and the $MS^2$ analysis in which the ion having the mass-to-charge ratio specified by B1 is set as the precursor ion is immediately executed, similarly to the aforementioned $MS^2$ analysis in which the ion having the mass-to-charge ratio specified by A1 are set as the precursor ion. As a result, in the mass spectrum creator 31, an $MS^2$ spectrum 31*c* is created.

As soon as the $MS^2$ spectrum 31*c* is obtained, the precursor ion selector 32 determines whether or not a precursor ion for the second-stage CID operation having the mass-to-charge ratio of B2 that are associated with the precursor ion for the first-stage CID operation having the mass-to-charge ratio of B1 in the precursor ion list 331 exist on the $MS^2$ spectrum 31*c*. Here, any ion peak having the mass-to-charge ratio specified by B2 is not observed on the $MS^2$ spectrum 31*c*. Hence a precursor ion is not selected, and the $MS^3$ analysis is not executed. Although an ion peak having the mass-to-charge ratio specified by C2 in the precursor ion list 331 exists on the $MS^2$ spectrum 31*c*, a precursor ion having the mass-to-charge ratio specified by C2 is effective in only the time range of t4 to t5, and the time t*y* is not in this time range. Hence, the ion peak having the mass-to-charge ratio specified by C2 is ignored.

In this way, the $MS^2$ spectrum 31*d* and the $MS^3$ spectrum 31*e* are obtained based on the $MS^1$ spectrum 31*b* obtained at the time t*y*. Such automatic selection of a precursor ion, an $MS^2$ analysis, and an $MS^3$ analysis based on an $MS^1$ spectrum obtained at a given time as described above are typically executed during a given time interval of repetitive mass analyses without a CID operation. In this case, in order to enable execution of the $MS^2$ analysis and the $MS^3$ analysis subsequently to a normal mass analysis, the time interval itself at which the mass analyses are executed may be set in advance to be larger. Alternatively, in the case where the $MS^2$ analysis and the $MS^3$ analysis are executed subsequently to one mass analysis, the end of these analyses may be awaited, and another mass analysis may then be executed. In this case, the time interval at which the normal mass analyses are executed is not constant but dynamically changed.

In the LC-MS system of the present embodiment, from the time point at which one sample is introduced into the liquid chromatograph 1 (or the time point delayed by a predetermined time from this time point) to the time point delayed as appropriate from the end of elution of components contained in the sample, $MS^1$ spectrum data is repetitively collected as described above. In the case where an $MS^2$ analysis and an $MS^3$ analysis are executed, $MS^2$ spectrum data and $MS^3$ spectrum data are also repetitively collected. The collected pieces of data are stored into the spectrum data storage unit 34.

As is apparent from FIG. 3B, the $MS^2$ spectrum 31*d* includes information on product ions generated by dissociating the ion originating from a target component having the mass-to-charge ratio of A1, and the $MS^3$ spectrum includes information on product ions generated by dissociating, in two stages, the ion originating from the target component having the mass-to-charge ratio of A1. Because all of these product ions are fragments of the target component, for example, database retrieval using such a compound database as described later is performed based on these pieces of information, whereby the components contained in the sample can be identified.

Figure 4:
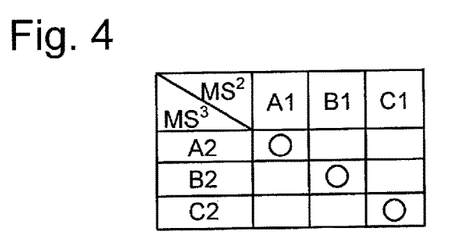
FIG. 4 is a diagram illustrating the combination of precursor ions for an $MS^3$ analysis executed according to the precursor ion list shown in FIG. 2.
Figure 8:
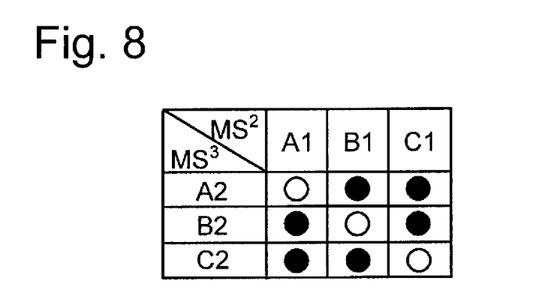
FIG. 8 is a diagram illustrating the combination of precursor ions for an $MS^3$ analysis executed according to the precursor ion list shown in FIG. 7.

FIG. 4 is a diagram illustrating the combination of precursor ions for an $MS^3$ analysis executed according to the precursor ion list shown in FIG. 2. Only the combinations indicated by a mark "◯" in FIG. 4 are the combinations of precursor ions based on which there is a possibility of executing an $MS^3$ analysis. In comparison, FIG. 8 is a diagram illustrating the combination of precursor ions for an $MS^3$ analysis executed according to a conventional precursor ion list shown in FIG. 7. The combinations indicated by a mark "○" and a mark "●" in FIG. 8 are the combinations of precursor ions based on which there is a possibility of executing an $MS^3$ analysis. The mark "○" indicates the combinations of precursor ions based on which an $MS^3$ spectrum meaningful for component identification can be acquired, whereas the mark "●" indicates the combinations of precursor ions based on which an $MS^3$ spectrum meaningful for component identification cannot be acquired, namely, the combinations of precursor ions for an unnecessary $MS^3$ analysis. As is apparent from comparison between FIG. 4 and FIG. 8, a conventional automatic $MS^n$ function is highly likely to execute an unnecessary $MS^3$ analysis, whereas the automatic $MS^n$ function of the LC-MS system of the present embodiment does not execute an unnecessary $MS^3$ analysis, so that the time allotted for meaningful analyses can be secured accordingly longer.

Figure 5:
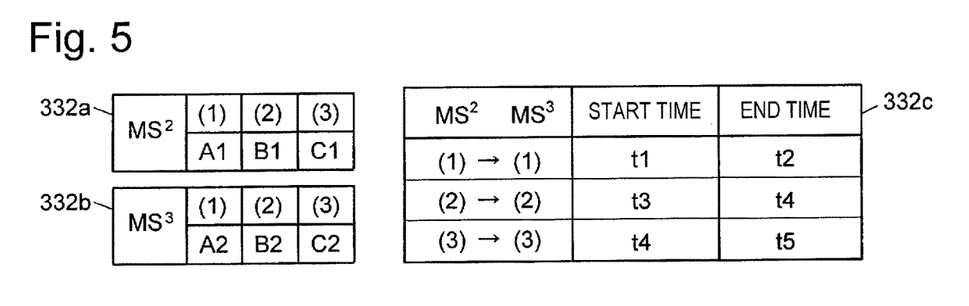
FIG. 5 is a diagram illustrating another example of the precursor ion list used in the LC-MS system of the present embodiment.

In the aforementioned embodiment, the precursor ion list 331 held in the precursor ion list memory unit 33 includes information indicating the combinations of ions to be subjected to the first-stage CID operation and ions to be subjected to the second-stage CID operation. Alternatively, the precursor ions in each stage and the ion combination information may be listed independently of each other. FIG. 5 shows an example case where the same information as the precursor ion list 331 shown in FIG. 2 is divided into two precursor ion lists 332a and 332b and an ion combination information list 332c. Even if the information itself is divided into the plurality of lists in this way, the combination of the precursor ion for the first-stage CID operation and the precursor ion for the second-stage CID operation can be obtained based on these lists, and control and processing similar to those in the aforementioned embodiment can be executed.

The information held in the precursor ion list memory unit 33 may be created in advance by a manufacturer of the present apparatus, or may be inputted by a user through the operation unit 6, for example. In the latter case, the user can create a precursor ion list best suited to identify a target component, using a mass spectrum acquired by the user himself/herself. However, it is significantly burdensome work to specify the combination of precursor ions one by one for a large number of components. In particular, if an operation is executed up to an $MS^n$ analysis whose n is equal to or more than 4, the work is further more burdensome. In view of this, the present system itself may be provided with a function of automatically creating the precursor ion list(s) shown in FIG. 2 or FIG. 5.

Figure 6:
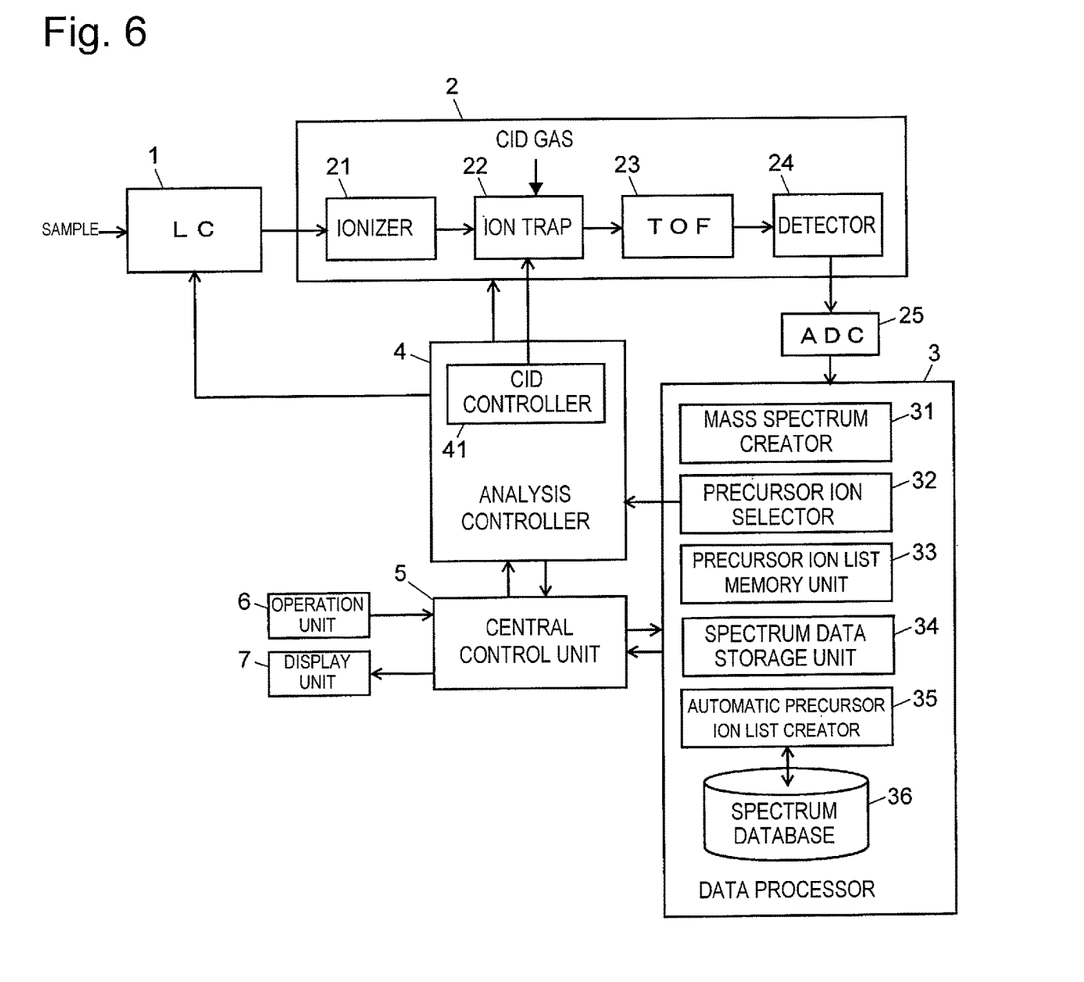
FIG. 6 is a schematic configuration diagram of another embodiment of the LC-MS system including the mass spectrometer according to the present invention.

FIG. 6 is a schematic configuration diagram of an LC-MS system provided with such a function, according to another embodiment. The data processor 3 includes an automatic precursor ion list creator 35 and a spectrum database 36, which are not included in the system of the aforementioned embodiment. The spectrum database 36 may be any of, for example, a database provided by the manufacturer of the present apparatus, a database that is created by various research institutes such as a university and is generally available via the Internet or the like, or a private database that is created by the user based on results of actually performed analyses and the like, as long as the spectrum database 36 is a database in which mass spectra (an $MS^1$ spectrum, an $MS^2$ spectrum, an $MS^3$ spectrum, . . . ) of various compounds desired to be identified are held. These databases are typically used for component identification using mass spectra as described above.

When the user performs a predetermined operation through the operation unit 6, in the data processor 3, the automatic precursor ion list creator 35 reads appropriate data out of the spectrum database 36, and collects such precursor ion information that enables acquisition of a mass spectrum on which information on a partial structure appears, the partial structure being suitable to characterize each component, namely, being characterized by each component. In the case of the example shown in FIG. 3B, the mass-to-charge ratio A1 of the precursor ion for the first-stage CID operation and the mass-to-charge ratio A2 of the precursor ion for the second-stage CID operation are obtained for a given known component. Note that the number of combinations of precursor ions for one component is not necessarily only one. Then, the automatic precursor ion list creator 35 creates such precursor ion list(s) as shown in FIG. 2 or FIG. 5, based on the precursor ion information collected for all or a part of the components registered in the spectrum database 36, and stores the precursor ion list(s) into the precursor ion list memory unit 33. As a result, the precursor ion list(s) based on the compound database constructed by the user himself/herself can be created without burdensome work.

In the aforementioned embodiments, the mass spectrometer according to the present invention is applied to the LC-MS, but it goes without saying that the mass spectrometer according to the present invention can also be applied to a GC-MS. Moreover, the mass spectrometer according to the present invention is useful in a configuration combined with a chromatograph, in terms of notable effectiveness produced in the case where sample components introduced into the mass spectrometer temporally change, but the combination with a chromatograph is not essential.

Furthermore, all the aforementioned embodiments are given as mere examples of the present invention, and are obviously included in the scope of claims of the present application even if any change, modification, or addition is made thereto as appropriate within the range along the gist of the present invention.

REFERENCE SIGNS LIST

1 . . . Liquid Chromatograph
2 . . . Mass Analyzer
21 . . . Ionizer
22 . . . Ion Trap
23 . . . Time-of-Flight Mass Spectrograph (TOF)
24 . . . Detector
3 . . . Data Processor
31 . . . Mass Spectrum Creator
32 . . . Precursor Ion Selector
33 . . . Precursor Ion List Memory Unit
34 . . . Spectrum Data Storage Unit
35 . . . Automatic Precursor Ion List Creator
36 . . . Spectrum Database
331, 332a, 332b . . . Precursor Ion List
332c . . . Ion Combination Information List
4 . . . Analysis Controller
41 . . . CID Controller
5 . . . Central Control Unit
6 . . . Operation Unit
7 . . . Display Unit

The invention claimed is:

1. A mass spectrometer capable of an $MS^n$ analysis (whose n is any integer equal to or more than 3) involving a dissociation operation conducted in at least n−1 stages, the mass spectrometer having an automatic $MS^n$ analysis function of executing, given an $MS^m$ (whose m is an integer) spectrum obtained through an $MS^m$ analysis, an operation of: selecting an ion that satisfy a predetermined condition as a precursor ion for an $MS^{m+1}$ analysis from the $MS^m$ spectrum; and dissociating the precursor ion and performing a mass analysis, until a value of m becomes n−1 in order from 1, the mass spectrometer comprising:
- a) a precursor ion information memory unit for holding information on mass-to-charge ratios of precursor ions to be dissociated in first to $m^{th}$ stages for the $MS^{m+1}$ analysis, in association with one another; and
- b) an analysis controller configured to acquire an $MS^n$ spectrum by executing, up to the $MS^n$ analysis, including
  - b1) a first stage precursor ion determiner for determining whether or not an ion that is held as a precursor ion to be dissociated in the first stage in the precursor ion information memory unit exists on an $MS^1$ spectrum obtained at a time of executing an analysis;
  - b2) a $MS^2$ analysis performer for performing an $MS^2$ analysis in which the ion is set as a precursor ion, if the ion exists;
  - b3) a second stage precursor ion determiner for determining whether or not an ion that is held as a precursor ion to be dissociated in the second stage in association with the precursor ion to be dissociated in the first stage in the precursor ion information memory unit exists on an $MS^2$ spectrum obtained through the $MS^2$ analysis; and
  - b4) a $MS^3$ analysis performer for performing an $MS^3$ analysis in which the ion are set as a precursor ion, if the ion exists;

wherein the ion information memory unit includes information regarding whether the precursor ion to be dissociated in the second stage can be acquired by the first stage dissociation.

2. The mass spectrometer according to claim 1, wherein the precursor ion information memory unit holds a list of a collection of information on the mass-to-charge ratios of the precursor ions to be dissociated in the first to $m^{th}$ stages for one $MS^{m+1}$ analysis.

3. The mass spectrometer according to claim 1, wherein the precursor ion information memory unit holds: m lists of a collection of information on the mass-to-charge ratios of the precursor ions to be dissociated for each of the first to $m^{th}$ stages; and information specifying a combination of the mass-to-charge ratios of the precursor ions respectively selected from the m lists, for one $MS^{m+1}$ analysis.

4. The mass spectrometer according to claim 1, wherein a chromatograph for separating components in a sample in a temporal direction is connected upstream of the mass spectrometer, and
the precursor ion information memory unit holds information indicating a time range in which the $MS^{m+1}$ analysis is performed, in addition to the information on the mass-to-charge ratios of the precursor ions to be dissociated in the first to $m^{th}$ stages during the $MS^{m+1}$ analysis.

5. The mass spectrometer according to claim 1, further comprising:
- c) a compound database for holding the $MS^1$ spectrum, the $MS^2$ spectrum, . . . , an $MS^{m+1}$ spectrum for a known compound; and
- d) a precursor ion information creator for: creating information in which the mass-to-charge ratios of the precursor ions to be dissociated in the first to $m^{th}$ stages during the $MS^{m+1}$ analysis are associated with one another, using the compound database; and storing the information into the precursor ion information memory unit.

6. The mass spectrometer according to claim 2, wherein a chromatograph for separating components in a sample in a temporal direction is connected upstream of the mass spectrometer, and
the precursor ion information memory unit holds information indicating a time range in which the $MS^{m+1}$ analysis is performed, in addition to the information on the mass-to-charge ratios of the precursor ions to be dissociated in the first to $m^{th}$ stages during the $MS^{m+1}$ analysis.

7. The mass spectrometer according to claim 3, wherein a chromatograph for separating components in a sample in a temporal direction is connected upstream of the mass spectrometer, and
the precursor ion information memory unit holds information indicating a time range in which the $MS^{m+1}$ analysis is performed, in addition to the information on the mass-to-charge ratios of the precursor ions to be dissociated in the first to $m^{th}$ stages during the $MS^{m+1}$ analysis.

8. The mass spectrometer according to claim 2, further comprising:
- c) a compound database for holding the $MS^1$ spectrum, the $MS^2$ spectrum, . . . , an $MS^{m+1}$ spectrum for a known compound; and
- d) a precursor ion information creator for: creating information in which the mass-to-charge ratios of the precursor ions to be dissociated in the first to $m^{th}$ stages during the $MS^{m+1}$ analysis are associated with one another, using the compound database; and storing the information into the precursor ion information memory unit.

9. The mass spectrometer according to claim 3, further comprising:
- c) a compound database for holding the $MS^1$ spectrum, the $MS^2$ spectrum, . . . , an $MS^{m+1}$ spectrum for a known compound; and
- d) a precursor ion information creator for: creating information in which the mass-to-charge ratios of the precursor ions to be dissociated in the first to $m^{th}$ stages during the $MS^{m+1}$ analysis are associated with one another, using the compound database; and storing the information into the precursor ion information memory unit.

10. The mass spectrometer according to claim 4, further comprising:
- c) a compound database for holding the $MS^1$ spectrum, the $MS^2$ spectrum, . . . , an $MS^{m+1}$ spectrum for a known compound; and
- d) a precursor ion information creator for: creating information in which the mass-to-charge ratios of the precursor ions to be dissociated in the first to $m^{th}$ stages during the $MS^{m+1}$ analysis are associated with one another, using the compound database; and storing the information into the precursor ion information memory unit.

11. The mass spectrometer according to claim 6, further comprising:
- c) a compound database for holding the $MS^1$ spectrum, the $MS^2$ spectrum, . . . , an $MS^{m+1}$ spectrum for a known compound; and
- d) a precursor ion information creator for: creating information in which the mass-to-charge ratios of the precursor ions to be dissociated in the first to $m^{th}$ stages during the $MS^{m+1}$ analysis are associated with one another, using the compound database; and storing the information into the precursor ion information memory unit.

12. The mass spectrometer according to claim 7, further comprising:
   c) a compound database for holding the $MS^1$ spectrum, the $MS^2$ spectrum, . . . , an $MS^{m+1}$ spectrum for a known compound; and
   d) a precursor ion information creator for: creating information in which the mass-to-charge ratios of the precursor ions to be dissociated in the first to $m^{th}$ stages during the $MS^{m+1}$ analysis are associated with one another, using the compound database; and storing the information into the precursor ion information memory unit.

13. A mass spectrometry method, comprising:
   performing an $MS^n$ analysis (whose n is any integer equal to or more than 3) involving a dissociation operation conducted in at least n−1 stages by a mass spectrometer, the mass spectrometer having an automatic $MS^n$ analysis function of executing, given an $MS^m$ (whose m is an integer) spectrum obtained through an $MS^m$ analysis, an operation of: selecting an ion that satisfy a predetermined condition as a precursor ion for an $MS^{m+1}$ analysis from the $MS^m$ spectrum; and dissociating the precursor ion and performing a mass analysis, until a value of m becomes n−1 in order from 1;
   a) holding information on mass-to-charge ratios of precursor ions to be dissociated in first to $m^{th}$ stages for the $MS^{m+1}$ analysis, in association with one another; and
   b) acquiring an $MS^n$ spectrum by executing, up to the $MS^n$ analysis, including
      b1) determining whether or not an ion that is held as a precursor ion to be dissociated in the first stage in the precursor ion information memory unit exists on an $MS^1$ spectrum obtained at a time of executing an analysis;
      b2) performing an $MS^2$ analysis in which the ion is set as a precursor ion, if the ion exists;
      b3) determining whether or not an ion that is held as a precursor ion to be dissociated in the second stage in association with the precursor ion to be dissociated in the first stage in the precursor ion information memory unit exists on an $MS^2$ spectrum obtained through the $MS^2$ analysis; and
      b4) performing an $MS^3$ analysis in which the ion are set as a precursor ion, if the ion exists;
   wherein the ion information memory unit includes information regarding whether the precursor ion to be dissociated in the second stage can be acquired by the first stage dissociation.

* * * * *